United States Patent [19]
Ohshita

[11] Patent Number: 5,499,142
[45] Date of Patent: Mar. 12, 1996

[54] LARGE APERTURE WIDE ANGLE TYPE PHOTOGRAPHIC LENS SYSTEM

[75] Inventor: Koichi Ohshita, Tokyo, Japan

[73] Assignee: Nikon Corporation, Tokyo, Japan

[21] Appl. No.: 222,865

[22] Filed: Apr. 5, 1994

[30] Foreign Application Priority Data

Apr. 27, 1993 [JP] Japan ................................ 5-101199

[51] Int. Cl.⁶ .............................. G02B 9/34; G02B 13/18
[52] U.S. Cl. ........................... 359/773; 359/715; 359/740
[58] Field of Search .................................. 359/773, 715, 359/740, 771, 772

[56] References Cited

U.S. PATENT DOCUMENTS

| | | | |
|---|---|---|---|
| 4,303,313 | 12/1981 | Imai et al. | 350/456 |
| 4,359,271 | 11/1982 | Mihara | 359/715 |
| 4,413,888 | 11/1983 | Sato | 350/432 |
| 4,606,607 | 8/1986 | Kurihara | 359/715 |
| 4,653,870 | 3/1987 | Imaizumi | 359/773 |
| 4,787,721 | 11/1988 | Fukushima et al. | 350/432 |
| 4,792,216 | 12/1988 | Kudo | 359/715 |

Primary Examiner—David C. Nelms
Assistant Examiner—Son Mai
Attorney, Agent, or Firm—Shapiro and Shapiro

[57] ABSTRACT

A large aperture wide angle type photographic lens system comprises a positive meniscus lens having a convex surface directed toward an object, a bi-concave lens provided at the image side with respect to the positive meniscus lens, a bi-convex lens provided at the image side with respect to the bi-concave lens and a negative meniscus lens having a convex surface directed toward an image and provided at the image side with respect to the bi-convex lens. The characteristics of the lenses have predetermined relationship.

16 Claims, 4 Drawing Sheets

LARGE APERTURE WIDE ANGLE TYPE PHOTOGRAPHIC LENS SYSTEM

BACKGROUND OF THE INVENTION

1. Field of the Invention

The present invention relates to a photographic lens system used in a so-called compact camera.

2. Related Background Art

A so-called telephoto-type wide angle lens system comprising a front group having a positive refracting power and a rear group having a negative refracting power can be made shorter in the overall length than a Tessar type lens system and used as a photographic lens system of a compact camera. The lens system of the type in which the front group consists of a positive lens, a negative lens and another positive lens (the total being three lenses) and the rear group consists of a single negative meniscus lens is manufactured at a relative low cost and aberrations can be corrected well. Thus, the lens system of this type is widely used. The structure of this lens system is disclosed in U.S. Pat. Nos. 4,303,313 and 4,413,888, for example.

However, very few telephoto-type lens systems had large apertures of an F-number of 2 or less. In particular, the smallest F-number of the telephoto-type lens system comprising the four groups consisting of four lenses as above-mentioned was considered to be 2.8. For example, the lens system disclosed in U.S. Pat. No. 4,303,313 has an F-number of about 3.5 and thus cannot be said that it has a large aperture. U.S. Pat. No. 4,413,888 only achieved an F-number of 2.8.

Later, U.S. Pat. No. 4,787,721 disclosed a lens system which intends to provide a large aperture. However, the lens system proposed by this patent must consist of five lenses and more having aspherical surfaces and has left problems on cost and productivity.

SUMMARY OF THE INVENTION

The object of the present invention is to achieve a lens system having a field angle of 60° and an aperture of an F-number of 2 formed by four groups consisting of the smallest number of four lenses.

In order to achieve the object of the present invention, a large aperture wide angle type photographic lens system comprises a positive meniscus lens having a convex surface directed toward an object, a bi-concave lens, a bi-convex lens and a negative meniscus lens having a convex surface directed toward an image, arranged in this order, and satisfies the following conditions:

(1) $0.4 < r1/f < 0.45$
(2) $0.55 < r4/f < 0.65$
(3) $-0.65 < r8/f < -0.4$
(4) $0.43 < (d5+d6)/f < 0.48$
(5) $-0.1 < f/f12 < 0.08$ where:

r1 is the radius of curvature of the object side surface of the positive meniscus lens;

r4 is the radius of the curvature of the image side surface of the bi-concave lens;

r8 is the radius of curvature of the image side surface of the negative meniscus lens;

d5 is the axial thickness of the bi-convex lens;

d6 is the axial air gap between the bi-convex lens and the negative meniscus lens;

f12 is the compound focal length of the combination of the positive meniscus lens and the bi-concave lens; and f is the compound focal length of the whole lens system.

In the large aperture wide angle type lens system according to the present invention, the surfaces of each lens are spherical, an aperture stop is provided between the bi-concave lens and the bi-convex lens and a fixed stop having a smaller diameter than the effective diameter of the image side surface of the bi-convex lens and disposed between the bi-convex lens and the negative meniscus lens.

This invention will be described with reference to FIG. 1 which shows a longitudinal cross-sectional view of an embodiment of a lens system according to the present invention. From the object toward the image are arranged a front group comprising a positive meniscus lens L1 having a convex surface (an object side surface) directed toward an object, a bi-concave lens L2 and a bi-convex lens L3, and a rear group formed by a single negative meniscus lens L4 having a convex surface (an image side surface) directed toward an image.

The refracting power which is provided by the negative lens which is the second lens in the triplet lens (comprising a positive lens, a negative lens and another positive lens in the conventional lens system) can be imparted by the bi-concave lens L2 and the negative meniscus lens L4 in the present invention. Thus, the spherical aberration can be corrected well and the image surface can be kept flat. Further, provision of the negative lens at the position closest to the image advantageously reduces the overall length of the lens system to a relatively small value.

The present invention visualizes a large aperture, which has not ever obtained, by the use of only four lenses formed and arranged so as to satisfy the above-mentioned conditions.

These conditions will be described.

Condition (1) defines the radius of curvature of the object side surface of the positive meniscus lens L1. High orders of spherical aberration which cause a problem to increase the aperture is suppressed by enlarging the radius of curvature as compared with the conventionally known radius of curvature. The lower limit of Condition (1) shows the critical point at which the high orders of the spherical aberration can be corrected. If the radius of curvature of this surface of the positive meniscus lens is made too large, on the other hand, astigmatism increases and it becomes difficult to maintain the flatness of the image surface. Thus, the upper limit of Condition (1) shows the limit of correcting the astigmatism well.

Condition (2) defines the radius of curvature of the image side surface of the bi-concave lens L2. When the curvature exceeds the upper limit, the Petzval sum becomes large and the sagittal image cannot be kept flat. On the other hand, when the radius of curvature of the image side surface of the bi-concave lens L2 exceeds the lower limit, the curvature becomes very large and the high orders of spherical aberration are generated.

Condition (3) defines the radius of curvature of the image side surface of the negative meniscus lens L4 and is intended to correct distortion well. When the radius of curvature of the related surface of the lens L4 is lower than the lower limit, it becomes impossible to correct positive distortion. Over the upper limit, on the other hand, the radius of curvature of the related surface becomes too small to becomes impossible to correct coma.

Condition (4) defines the axial distance between the object side surface of the bi-convex lens L3 and the object side surface of the negative meniscus lens L4. When the axial distance is smaller than the lower limit, it is difficult to correct spherical aberration and astigmatism well simultaneously under the condition in which Condition (1) is satisfied. Reversely, the whole lens system becomes large over the upper limit.

Condition (5) defines the compound focal length of the combination of the positive meniscus lens L1 and the bi-concave lens L2. Over the upper limit, sagittal coma flare increases, and the off-axis characteristic deteriorates. Under the lower limit, the height of axial light rays passing through the bi-convex lens increases. Thus, strict lens mounting tolerances are required which reduces productivity.

In this embodiment, all lens surfaces can be made spherical in order to reduce cost and improve productivity. An aperture stop is provided between the bi-concave lens L2 and the bi-convex lens L3 in order to obtain an enough peripheral light quantity and correct the off-axial characteristic well. In order to limit a harmful light, it is preferred that a fixed stop having a smaller diameter than the effective diameter of the image side surface of the bi-convex lens be provided between the bi-convex lens L3 and the negative meniscus lens L4.

In order to correct aberrations well, the lens system according to the present invention preferably satisfies the following conditions further.

(6) $-1.0 < r2/r3 < -0.8$
(7) $-0.8 < r5/r6 < -0.6$
(8) $0.18 < d5/f < 0.3$
(9) $3.58 < n1+n3$
(10) $0.05 < n2-n4 < 0.15$
(11) $36 < v4 < 44$
(12) $0.83 < X/Y < 0.97$ where:

r2 is the radius of curvature of the image side surface of the positive meniscus lens L1;

r3 is the radius of curvature of the object side surface of the bi-concave lens L2;

r5 is the radius of curvature of the object side surface of the bi-convex lens L3;

r6 is the radius of curvature of the image side surface of the bi-convex lens L3;

n1 is the refractive index of the positive meniscus lens L1 for the d line;

n2 is the refractive index of the bi-concave lens L2 for the d line;

n3 is the refractive index of the bi-convex lens L3 for the d line;

n4 is the refractive index of the negative meniscus lens L4 for the d line;

v4 is the Abbe's number of the negative meniscus lens L4;

X is the diameter of the fixed stop disposed between the bi-convex lens L3 and the negative meniscus lens L4; and Y is the effective diameter of the image side surface of the bi-convex lens L3.

Condition (6) relates to correction of astigmatism. Below the lower limit, the astigmatic difference becomes large at the maximum field angle and the off-axial characteristic is deteriorated. Beyond the upper limit, bending of spherical aberration becomes large, and it is difficult to keep large aperture ratio to an F-number of 2.

Condition (7) relates to correction of coma. It is difficult to correct coma well over the upper limit and below the lower limit.

Condition (8) shows the range in which astigmatism is corrected well. When the condition is closer to the upper limit, spherical aberration is maintained to a small value. Thus, astigmatism can be easily corrected and this is beneficial when aberrations are corrected. However, the bi-convex lens L3 becomes thick, leading to a bulky lens system. Further, the air gap between the bi-convex lens L3 and the negative meniscus lens L4 becomes too small. The negative meniscus lens L4 adversely increases high order of spherical orders of aberration. Below the lower limit, astigmatism cannot be corrected well.

Condition (9) defines the refractive index of the positive lenses in the lens system. Below the lower limit, the refractive index becomes too small, and good aberration correction cannot be expected.

Condition (10) refers to the refractive index of the negative lens in the lens system. Above the upper limit, the refractive index of the negative meniscus lens L4 becomes too small to correct spherical aberration and distortion, or the refractive index of the bi-concave lens becomes too high to correct Petzval sum. On the other hand, below the lower limit, the refractive index of the bi-concave lens L2 becomes too small to keep high order of spherical aberration to a value lower than the maximum value, or to correct Petzval sum well.

Condition (11) relates to chromatic aberration. It becomes difficult to correct both axial and off-axial chromatic aberration well when the condition exceeds the upper and lower limits.

Condition (12) defines the diameter of the field stop. Above the upper limit, the diameter of the fixed stop becomes too large, reducing the effect of the field stop as a flare stop. On the contrary, below the lower limit, the peripheral light quantity is reduced.

As a result, the values in the ranges defined by the above conditions are preferable.

DETAILED DESCRIPTION OF THE PREFERRED EMBODIMENTS

Figure 1:
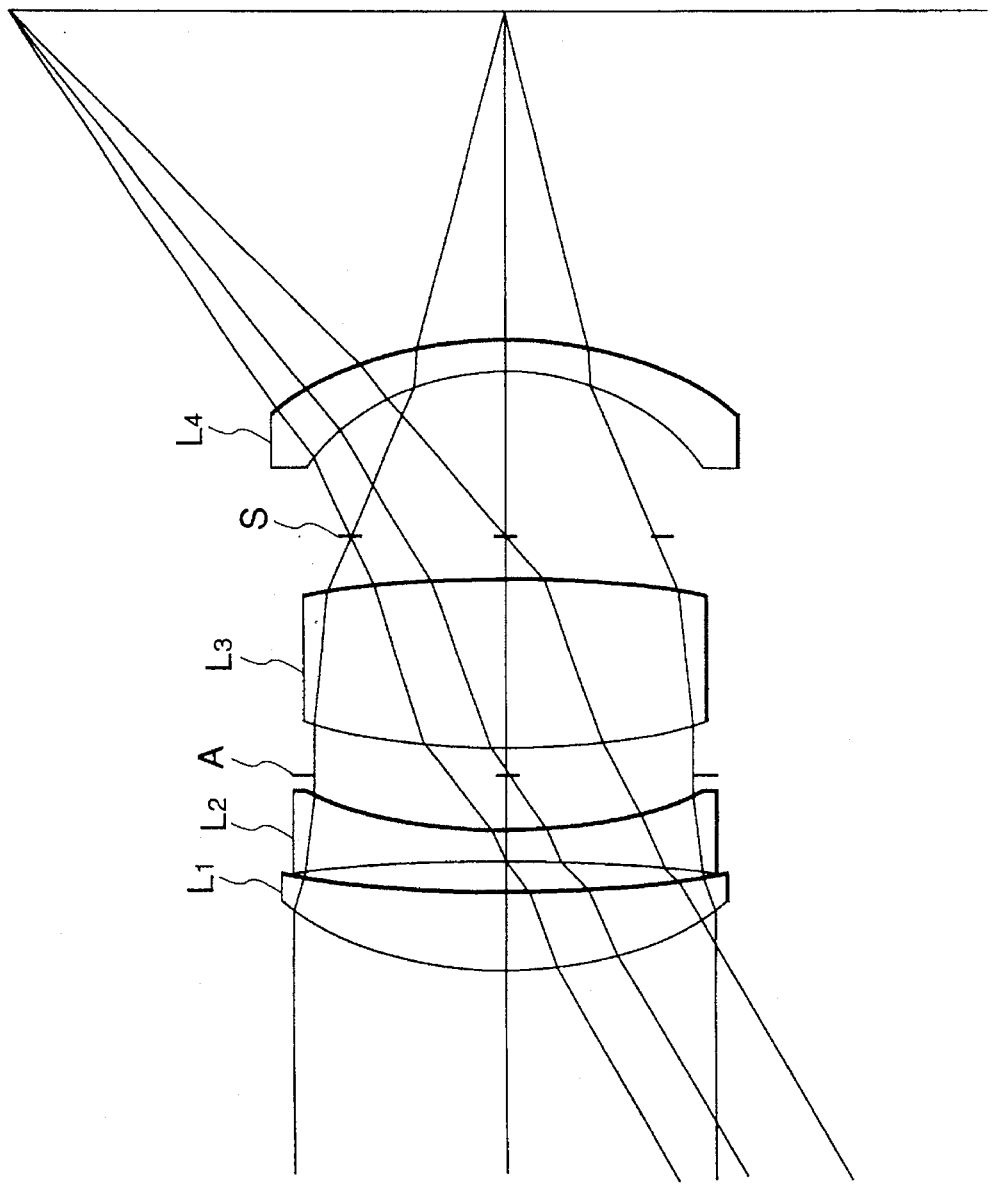
FIG. 1 is a general longitudinal cross-sectional view of the lens groups according to a first embodiment of the present invention.
Figure 2:
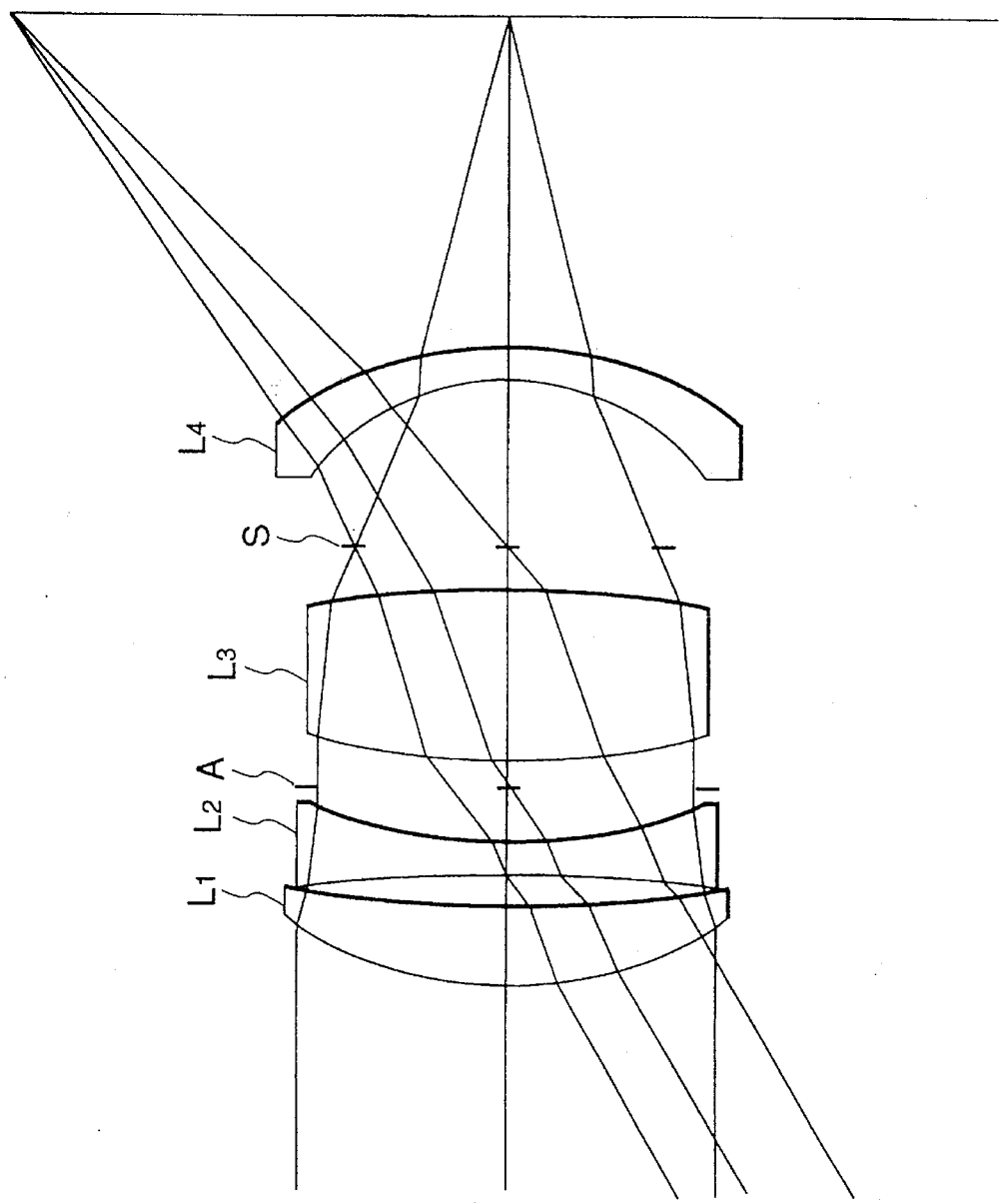
FIG. 2 is a general longitudinal cross-sectional view of the lens groups according to a second embodiment of the present invention.
Figure 3:
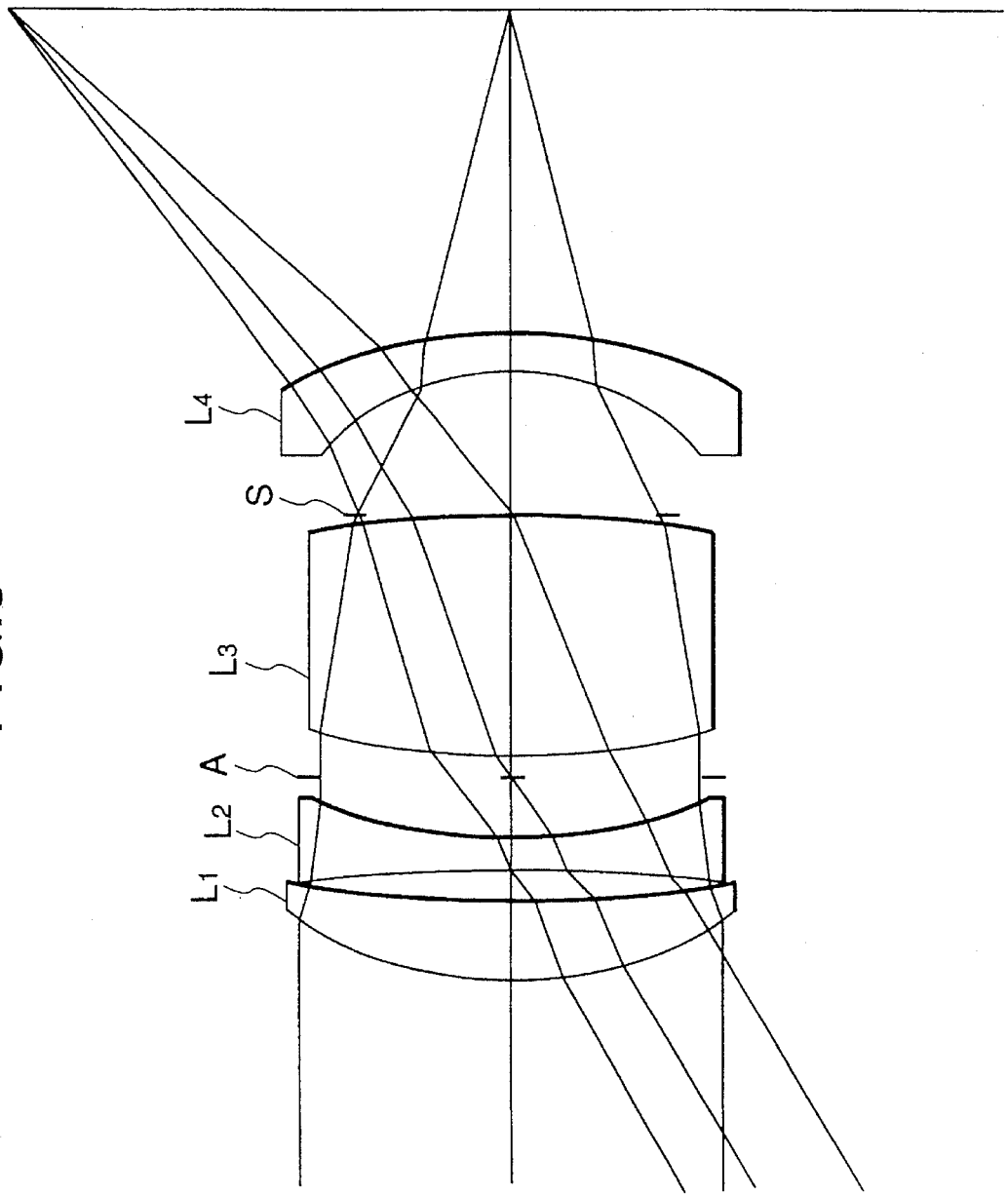
FIG. 3 is a general longitudinal cross-sectional view of the lens groups according to a third embodiment of the present invention.
Figure 4:
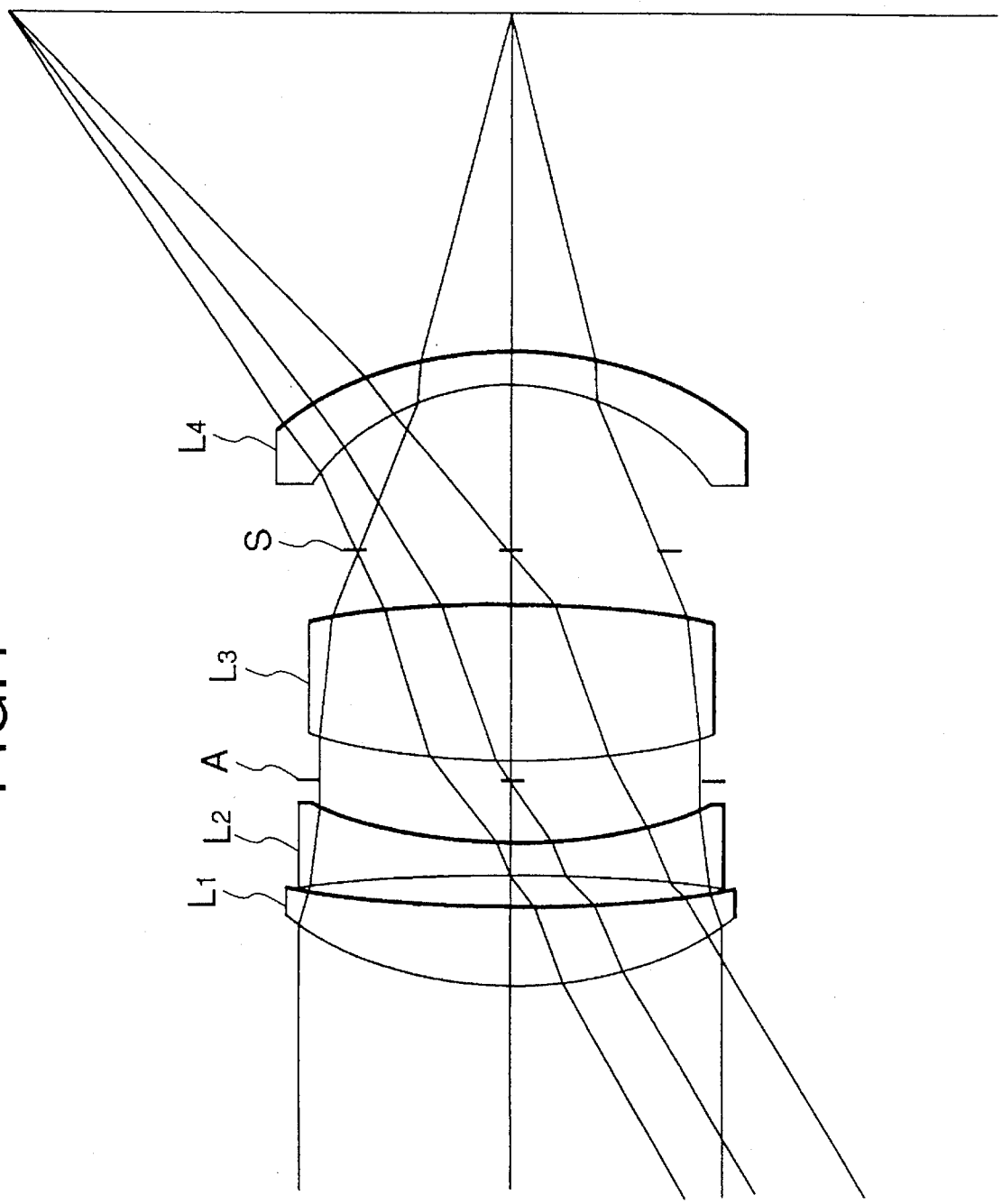
FIG. 4 is a general longitudinal cross-sectional view of the lens groups according to a fourth embodiment of the present invention.

Longitudinal cross-sectional views of lens systems according to first to fourth embodiments of the present invention are shown in FIGS. 1 to 4, respectively. Each lens system comprises a positive meniscus lens L1 having a convex surface (an object side convex surface) directed to an object, a bi-concave lens L2, an aperture stop A, a bi-convex lens L3 having a convex surface (an image side surface) directed toward an image, a fixed stop S having a smaller diameter than the effective diameter of the image side surface of the bi-convex lens L3, and a negative meniscus lens L4 having a concave surface (an image side surface) directed toward an image, arranged in this order.

The dimensions of the lens systems of the first to fourth embodiments are shown in Tables 1 to 4, respectively. In these tables, f's are the focal lengths of the whole lens systems, FN's are the F-numbers, Bf's are the back foci, the figures at the left ends are the surface numbers, R's are the radii of curvature, D's are the distances between the surfaces, along the axis Abbe's are the Abbe's numbers, N's are the refractive indexes for the d line (λ=587.6 nm).

The fifth and eighth surfaces of each embodiment are the aperture stop and the fixed stop, respectively.

TABLE 1

Dimensions of the First Embodiment
f = 38.00  Bf = 14.71  FN = 2.05

|   | R | D | Abbe | N |
|---|---|---|---|---|
| 1 | 16.4640 | 3.5000 | 43.34 | 1.84042 |
| 2 | 48.4680 | 1.5000 |  | 1.0 |
| 3 | −56.7960 | 1.4000 | 25.48 | 1.73038 |
| 4 | 23.5920 | 2.6000 |  | 1.0 |
| 5 | ∞ | 1.0000 |  | 1.0 |
| 6 | 30.8520 | 8.0000 | 43.34 | 1.84042 |
| 7 | −44.4310 | 2.0000 |  | 1.0 |
| 8 | ∞ | 7.6000 |  | 1.0 |
| 9 | −10.7160 | 1.6000 | 38.05 | 1.60342 |
| 10 | −17.5207 | 14.7130 |  | 1.0 |

TABLE 2

Dimensions of the Second Embodiment
f = 38.00  Bf = 14.87  FN = 2.05

|   | R | D | Abbe | N |
|---|---|---|---|---|
| 1 | 16.0816 | 3.4000 | 45.37 | 1.79668 |
| 2 | 52.6276 | 1.5000 |  | 1.0 |
| 3 | −54.2093 | 1.4000 | 25.48 | 1.73038 |
| 4 | 23.6858 | 2.6000 |  | 1.0 |
| 5 | ∞ | 1.0000 |  | 1.0 |
| 6 | 30.9467 | 7.8000 | 43.34 | 1.84042 |
| 7 | −43.7106 | 2.2000 |  | 1.0 |
| 8 | ∞ | 7.4000 |  | 1.0 |
| 9 | −10.6428 | 1.6000 | 36.99 | 1.61293 |
| 10 | −17.3787 | 14.8661 |  | 1.0 |

TABLE 3

Dimensions of the Third Embodiment
f = 38.00  Bf = 14.83  FN = 2.05

|   | R | D | Abbe | N |
|---|---|---|---|---|
| 1 | 15.6245 | 3.5000 | 44.69 | 1.80218 |
| 2 | 54.1033 | 1.4000 |  | 1.0 |
| 3 | −66.0503 | 1.4000 | 25.48 | 1.73038 |
| 4 | 22.0536 | 2.7000 |  | 1.0 |
| 5 | ∞ | 1.0000 |  | 1.0 |
| 6 | 27.0145 | 11.0000 | 45.37 | 1.79668 |
| 7 | −38.5692 | .0000 |  | 1.0 |
| 8 | ∞ | 6.6000 |  | 1.0 |
| 9 | −11.0446 | 1.6000 | 41.96 | 1.66755 |
| 10 | −22.5130 | 14.8262 |  | 1.0 |

TABLE 4

Dimensions of the Fourth Embodiment
f = 38.00  Bf = 14.92  FN = 2.05

|   | R | D | Abbe | N |
|---|---|---|---|---|
| 1 | 16.3587 | 3.5000 | 44.52 | 1.81554 |
| 2 | 51.5538 | 1.6000 |  | 1.0 |
| 3 | −52.4955 | 1.4000 | 25.48 | 1.73038 |
| 4 | 23.8246 | 2.6000 |  | 1.0 |
| 5 | ∞ | 1.0000 |  | 1.0 |
| 6 | 32.0272 | 7.0000 | 43.34 | 1.84042 |
| 7 | −42.7851 | 2.4000 |  | 1.0 |
| 8 | ∞ | 7.6000 |  | 1.0 |
| 9 | −10.6310 | 1.6000 | 39.20 | 1.59551 |

TABLE 4-continued

| 10 | −16.8406 | 14.9245 |  | 1.0 |

In Table 5 are shown the values of the conditions (1) to (12) for the first to fourth embodiments.

TABLE 5

|   |   | 1st Embodiment | 2nd Embodiment | 3rd Embodiment | 4th Embodiment |
|---|---|---|---|---|---|
| (1) | r1/f | 0.433 | 0.423 | 0.411 | 0.430 |
| (2) | r4/f | 0.621 | 0.623 | 0.580 | 0.627 |
| (3) | −r8/f | 0.461 | 0.457 | 0.592 | 0.443 |
| (4) | (d5 + d6)/f | 0.463 | 0.458 | 0.463 | 0.447 |
| (5) | −f/f12 | 0.047 | 0.051 | −0.051 | 0.061 |
| (6) | −r2/r3 | 0.853 | 0.970 | 0.819 | 0.982 |
| (7) | −r5/r6 | 0.694 | 0.708 | 0.700 | 0.749 |
| (8) | d5/f | 0.211 | 0.205 | 0.289 | 0.184 |
| (9) | n1 + n3 | 3.681 | 3.637 | 3.599 | 3.656 |
| (10) | n2 − n4 | 0.127 | 0.117 | 0.063 | 0.135 |
| (11) | ν4 | 38.1 | 37.0 | 42.0 | 39.2 |
| (12) | X/Y | 0.864 | 0.853 | 0.957 | 0.848 |

As apparent from FIGS. 1 to 4, it is found that various kinds of aberration are corrected well in spite of the facts that the field angle is about 60° and the F-number is 2.

According to the present invention, a lens system having a wide field angle of about 60° and large aperture of F-number 2 can be achieved by only four lenses. Therefore, not only a large aperture wide angle type lens system having F-number of 2 can be manufactured at a cost equal to or less than the cost at which the conventional wide angle lens system having the F-number of 2.8 can be manufactured but also a large aperture type lens system much smaller than the conventional large aperture type lens system designed on the basis of Gauss type lens system can be obtained.

The lenses in the embodiments have no aspherical surfaces are used in order to provide inexpensive small lens systems each having a large aperture. It is needless to say, however, that any surfaces are made aspherical under the conditions described above, thereby correcting aberrations better and miniaturizing the lens system.

What is claimed is:

1. A large aperture wide angle type photographic lens system comprising:

a positive meniscus lens having an object side convex surface directed toward an object and provided coaxially with an optical axis;

a bi-concave lens provided at an image side of said positive meniscus lens and coaxially with said optical axis and having an image side surface;

a bi-convex lens provided at an image side of said bi-concave lens and coaxially with said optical axis; and a negative meniscus lens provided at an image side of said bi-convex lens and coaxially with said optical axis and having an image side convex surface directed toward an image; and wherein the following conditions are satisfied:

0.4<r1/f<0.45

−0.65<r8/f<−0.4

0.43<(d5+d6)/f<0.48 where:

r1 is a radius of curvature of said object side convex surface of said positive meniscus lens;

r8 is a radius of curvature of said image side convex surface of said negative meniscus lens;

d5 is an axial thickness of said bi-convex lens;

d6 is an axial distance between said bi-convex lens and said negative meniscus lens; and f is a compound focal length of the whole lens system.

2. A large aperture wide angle type photographic lens system according to claim 1, wherein the following conditions are satisfied:

$0.55 < r4/f < 0.65$
$-0.1 < f/f12 < 0.08$ where:

r4 is a radius of curvature of said image side surface of said bi-concave lens; and f12 is a compound focal length of a combination of said positive meniscus lens and said bi-concave lens.

3. A large aperture wide angle type lens system according to claim 2, wherein said positive meniscus lens, said bi-concave lens, said bi-convex lens and said negative meniscus lens have lens surfaces including said object side convex surface of said positive meniscus lens, said image side convex surfaces of said negative meniscus lens and said image side surface of said bi-concave lens, all of which are directed in said optical axis, and all of said surfaces are spherical.

4. A large aperture wide angle type photographic lens system comprising:

a positive meniscus lens having an object side convex surface directed toward an object;

a bi-concave lens provided at an image side of said positive meniscus lens and provided with an image side surface having an effective diameter;

a bi-convex lens provided at an image side of said bi-concave lens;

a negative meniscus lens provided at an image side of said bi-convex lens and having an image side convex surface directed toward an image;

an aperture stop provided between said bi-concave lens and said bi-convex lens; and a fixed stop having a smaller diameter than said effective diameter at image side surface of said bi-convex lens and provided between said bi-convex lens and said negative meniscus lens.

5. A large aperture wide angle type photographic lens system comprising:

a positive meniscus lens having an object side convex surface directed toward an object;

a bi-concave lens provided at an image side of said positive meniscus lens and provided with an image side surface;

a bi-convex lens provided at an image side of said bi-concave lens and having an object side surface and an image side surface; and a negative meniscus lens provided at an image side of said bi-convex lens and having an image side convex directed toward an image; and wherein the following conditions are satisfied:

$0.4 < r1/f < 0.45$
$-0.8 < r5/r6 < -0.6$ where:

r1 is a radius of curvature of said object side convex surface of positive meniscus lens;

r5 is a radius of curvature of said object side surface of bi-convex lens;

r6 is a radius of curvature of image side surface of said bi-convex lens; and f is a compound focal length of the whole optical system.

6. A large aperture wide angle type photographic lens system according to claim 5, wherein the following conditions are satisfied:

$-0.65 < r8/f < -0.4$
$0.43 < (d5+d6)/f < 0.48$ where:

r8 is a radius of curvature of said image side convex surface of said negative meniscus lens;

d5 is an axial thickness of said bi-convex lens; and d6 is an axial distance between said bi-convex lens and said negative meniscus lens.

7. A large aperture wide angle type photographic lens system according to claim 6, wherein the following conditions are satisfied:

$0.55 < r4/f < 0.65$
$-0.1 < f/f12 < 0.08$ where:

r4 is a radius of curvature of said image side of said bi-concave lens; and f12 is a compound focal length of a combination of said positive meniscus lens and said bi-concave lens.

8. A large aperture wide angle type photographic lens system comprising:

a positive meniscus lens having an object side convex surface directed toward an object;

a bi-concave lens provided at an image side of said positive meniscus lens and provided with an image side surface;

a bi-convex lens provided at an image side of said bi-concave lens and having an object side surface and an image side surface; and a negative meniscus lens provided at an image side of said bi-convex lens and having an image side convex surface directed toward an image; and wherein the following conditions are satisfied:

$0.18 < d5/f < 0.3$
$-0.8 < r5/r6 < -0.6$ where:

d5 is an axial thickness of said bi-convex lens;

r5 is a radius of curvature of said object side surface of said bi-convex lens;

r6 is a radius of curvature of said image side surface of said bi-convex lens; and f is a compound focal length of the whole lens system.

9. A large aperture wide angle type photographic lens system according to claim 8, wherein the following conditions are satisfied:

$0.4 < r1/f < 0.45$
$-0.65 < r8/f < -0.4$ where:

r1 is a radius of curvature of said objective side convex surface of said positive meniscus lens; and r8 is a radius of curvature of said image side convex surface of said negative meniscus lens.

10. A large aperture wide angle type photographic lens system according to claim 9, wherein the following conditions are satisfied:

$0.55 < r4/f < 0.65$
$-0.1 < f/f12 < 0.08$ where:

r4 is a radius of curvature of said image side surface of said bi-concave lens; and f12 is a compound focal length of a combination of said positive meniscus lens and said bi-concave lens.

11. A large aperture wide angle type photographic lens system comprising:

a positive meniscus lens having an object side convex surface directed toward an object;

a bi-concave lens provided at an image side of said positive meniscus lens and provided with an image side surface;

a bi-convex lens provided at an image side of said bi-concave lens and having an object side surface and an image side surface; and a negative meniscus lens provided at an image side of said bi-convex lens and having an image side convex surface directed toward an image; and wherein the following conditions are satisfied:

$0.4 < r1/f < 0.45$
$0.55 < r4/f < 0.65$
$-0.65 < r8/f < -0.4$
$0.43 < (d5+d6)/f < 0.48$ where:

r1 is a radius of curvature of said objective side convex surface of said positive meniscus lens;

r4 is a radius of curvature of said image side surface of said bi-concave lens;

r8 is a radius of curvature of said image side convex surface of said negative meniscus lens;

d5 is an axial thickness of said bi-convex lens;

d6 is an axial distance between said bi-convex lens and said negative meniscus lens; and f is a compound focal length of the whole lens system.

12. A large aperture wide angle type photographic lens system according to claim 11, wherein the following conditions are satisfied:

$-0.8 < r5/r6 < -0.6$
$36 < v4 < 44$
$3.58 < n1+n3$
$0.05 < n2-n4 < 0.15$ where:

r5 is a radius of curvature of said object side surface of bi-convex lens;

r6 is a radius of curvature of said image side surface of said bi-convex lens;

v4 is an Abbe's number of said negative meniscus lens;

n1 is a refractive index of said positive meniscus lens for the d line;

n2 is a refractive index of said bi-concave lens for the d line;

n3 is a refractive index of said bi-convex lens for the d line; and n4 is a refractive index of said negative meniscus lens for the d line.

13. A large aperture wide angle type photographic lens system comprising:

a positive meniscus lens having an object side convex surface directed toward an object;

a bi-concave lens provided at an image side of said positive meniscus lens and provided with an image side surface;

a bi-convex lens provided at an image side of said bi-concave lens and having an object side surface and an image side surface; and a negative meniscus lens provided at an image side of said bi-convex lens and having an image side convex surface directed toward an image; and wherein the following conditions are satisfied:

$-0.8 < r5/r6 < -0.6$
$3.58 < n1+n3$
$0.05 < n2-n4 < 0.15$ where:

r5 is a radius of curvature of said object side surface of bi-convex lens;

r6 is a radius of curvature of said image side surface of said bi-convex lens;

n1 is a refractive index of said positive meniscus lens for the d line;

n2 is a refractive index of said bi-concave lens for the d line;

n3 is a refractive index of said bi-convex lens for the d line; and n4 is a refractive index of said negative meniscus lens for the d line.

14. A large aperture wide angle type photographic lens system according to claim 13, wherein the following conditions are satisfied:

$0.4 < r1/f < 0.45$
$-0.65 < r8/f < -0.4$
$36 < v4 < 44$ where:

r1 is a radius of curvature of said objective side convex surface of said positive meniscus lens;

r8 is a radius of curvature of said image side convex surface of said negative meniscus lens;

v4 is an Abbe's number of said negative meniscus lens; and f is a compound focal length of the whole lens system.

15. A large aperture wide angle type photographic lens system according to claim 14, wherein the following conditions are satisfied:

$0.55 < r4/f < 0.65$
$0.18 < d5/f < 0.3$ where:

r4 is a radius of curvature of said image side surface of said bi-concave lens; and d5 is an axial thickness of said bi-convex lens.

16. A large aperture wide angle type photographic lens system according to claim 4, wherein the following conditions are satisfied:

$0.83 < X/Y < 0.97$ where:

X is the diameter of the fixed stop disposed between the bi-convex lens and the negative meniscus lens; and Y is the effective diameter of the image side surface of the bi-convex lens.

* * * * *